(12) United States Patent
Aoki

(10) Patent No.: US 10,155,189 B2
(45) Date of Patent: Dec. 18, 2018

(54) EXHAUST GAS TREATING DEVICE AND MANUFACTURING METHOD OF HONEYCOMB STRUCTURE

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 61 days.

(21) Appl. No.: 15/248,143

(22) Filed: Aug. 26, 2016

(65) Prior Publication Data
US 2017/0065920 A1    Mar. 9, 2017

(30) Foreign Application Priority Data

Sep. 4, 2015    (JP) ................ 2015-175148

(51) Int. Cl.
| | | |
|---|---|---|
| *B01D 46/24* | (2006.01) | |
| *B01D 46/00* | (2006.01) | |
| *F01N 13/00* | (2010.01) | |
| *B01D 46/42* | (2006.01) | |
| *F01N 3/022* | (2006.01) | |
| *F01N 3/28* | (2006.01) | |

(52) U.S. Cl.
CPC ..... *B01D 46/2422* (2013.01); *B01D 46/0001* (2013.01); *B01D 46/0047* (2013.01); *B01D 46/247* (2013.01); *B01D 46/2459* (2013.01); *B01D 46/2462* (2013.01); *B01D 46/2474* (2013.01); *B01D 46/4236* (2013.01); *F01N 3/0222* (2013.01); *F01N 3/2828* (2013.01); *F01N 13/0097* (2014.06); *F01N 2470/18* (2013.01); *Y02T 10/20* (2013.01)

(58) Field of Classification Search
None
See application file for complete search history.

(56) References Cited

U.S. PATENT DOCUMENTS

| | | | |
|---|---|---|---|
| 7,488,412 B2 | 2/2009 | Abe et al. | |
| 7,510,588 B2 * | 3/2009 | Kudo | B01D 39/2068 55/523 |

(Continued)

FOREIGN PATENT DOCUMENTS

| | | |
|---|---|---|
| JP | 2003-024726 A1 | 1/2003 |
| JP | 2012-529592 A1 | 11/2012 |
| JP | 5368959 B2 | 12/2013 |

*Primary Examiner* — Amber R Orlando
(74) *Attorney, Agent, or Firm* — Burr & Brown, PLLC

(57) ABSTRACT

An exhaust gas treating device includes a honeycomb structure including an inner honeycomb structure body including a honeycomb substrate having porous inner partition walls and a circumferential wall disposed at a circumference of the honeycomb substrate, an outer honeycomb structure body disposed at a position which surrounds a part of a circumference of the inner honeycomb structure body and is away from the inner inflow end face, and plugging portions; and a can member storing the honeycomb structure. The can member includes an inflow tube and a barrel portion which is continuous with the inflow tube, and in the barrel portion an outlet is formed, the honeycomb structure is stored in the can member in a state of having a clearance between a second end face and the can member and having a clearance between the outer outflow end face and the can member.

10 Claims, 7 Drawing Sheets

(56) References Cited

U.S. PATENT DOCUMENTS

| | | |
|---|---|---|
| 8,713,920 B2 | 5/2014 | Brück et al. |
| 8,940,242 B2 * | 1/2015 | Chen ............... F01N 3/2828 |
| | | 422/168 |
| 8,978,366 B2 * | 3/2015 | Brugger ............. F01N 3/035 |
| | | 60/295 |
| 9,322,309 B2 * | 4/2016 | Beyer ................. F01N 3/20 |
| 9,341,096 B2 | 5/2016 | Brueck et al. |
| 2004/0131512 A1 | 7/2004 | Abe et al. |
| 2006/0107656 A1 * | 5/2006 | Bruck ................ F01N 3/281 |
| | | 60/288 |
| 2008/0110341 A1 * | 5/2008 | Ketcham ........... F01N 3/0222 |
| | | 95/274 |
| 2008/0264048 A1 * | 10/2008 | Nishiyama ....... B01D 53/9431 |
| | | 60/299 |
| 2009/0241780 A1 * | 10/2009 | Ohya ................ F01N 3/023 |
| | | 95/279 |
| 2012/0198838 A1 | 8/2012 | Brück et al. |
| 2012/0260639 A1 * | 10/2012 | Bruck ................. F01N 3/28 |
| | | 60/311 |
| 2014/0090364 A1 | 4/2014 | Brück et al. |

* cited by examiner

EXHAUST GAS TREATING DEVICE AND MANUFACTURING METHOD OF HONEYCOMB STRUCTURE

The present application is an application based on JP-2015-175148 filed on Sep. 4, 2015 with Japan Patent Office, the entire contents of which are incorporated herein by reference.

BACKGROUND OF THE INVENTION

Field of the Invention

The present invention relates to an exhaust gas treating device and a manufacturing method of a honeycomb structure, and more particularly, it relates to an exhaust gas treating device which can be downsized as a whole and which is easy to be heated and hard to be rapidly cooled, and a manufacturing method of a honeycomb structure.

Description of the Related Art

An internal combustion engine has a problem that cinders are generated during combustion of fuel. To eliminate the problem, from the viewpoint of taking atmospheric environment into consideration, a removal of harmful components included in an exhaust gas and countermeasures to prevent a particulate matter (hereinafter also referred to as "the PM" sometimes) such as soot or ash from being discharged to the atmosphere are required simultaneously.

Heretofore, regulations on the removal of the PM emitted from a diesel engine tends to be strengthened worldwide, and a use of a honeycomb filter as a trapping filter to remove the PM (hereinafter also referred to as "the DPF" sometimes) attracts attention. In this honeycomb filter, suppressing an increase of a pressure loss requires increasing a filter volume. On the other hand, in a car or the like, enlarging an engine or an indoor space is given priority. Therefore, limiting a mounting space of the filter or the like causes the problem that it is difficult to increase the filter volume. Furthermore, various exhaust gas treating devices in which such honeycomb filters are used (see Patent Document 1) have been proposed.

Furthermore, in recent years, a temperature of the exhaust gas tends to be lowered by improving a combustion efficiency of the internal combustion engine. Therefore, heat required for a catalytic activity would run short. To eliminate this problem, exhaust gas treating devices in which heat of the exhaust gas is effectively utilized (Patent Documents 2 and 3) have been proposed.

[Patent Document 1] JP-A-2003-024726
[Patent Document 2] JP 5368959
[Patent Document 3] JP-T-2012-529592

SUMMARY OF THE INVENTION

An exhaust gas treating device described in Patent Document 1 can be designed compactly. However, in this exhaust gas treating device, a circumference of a processed portion is coated, and this causes a thermal shock resistance to deteriorate. Therefore, it has been difficult to use this exhaust gas treating device in a case where a high-temperature exhaust gas is emitted as in an application of a filter for a gasoline engine.

On the other hand, even in a situation where the temperature of the exhaust gas is comparatively low as in an application of a filter for a diesel engine, it is difficult to directly expose the circumferential coated portion to the exhaust gas from a viewpoint of maintaining durability. Therefore, it has been difficult to pass the exhaust gas through a circumference of a catalyst carrier (a honeycomb filter).

Furthermore, from a viewpoint of activating a catalyst in an early period, it is the present mainstream to dispose the catalyst purifying the exhaust gas directly under the engine. This is because the temperature of the catalyst can easily be raised directly under the engine. However, a space of an engine room is limited, and an efficient disposition of the catalyst purifying the exhaust gas (the exhaust gas treating device) is required.

Here, in a metal carrier (the catalyst carrier made of a metal) in which a mat is not used to hold the catalyst carrier (the honeycomb filter), an arrangement has heretofore been made by utilizing the merit that the mat does not have to be used. That is, a design in which a converter is miniaturized (i.e., the compact converter design) is developed, and the design is suggested to and employed by a car company. This converter design allows the temperature of the catalyst carrier to be kept high by passing the exhaust gas also through the circumference of the catalyst carrier.

Furthermore, a similar design also can be technically employed in a ceramic catalyst carrier (a honeycomb filter). However, the ceramic catalyst carrier requires the mat when it is held, and hence a diameter of the ceramic catalyst carrier becomes smaller than that of the metal carrier. This causes the ceramic catalyst carrier to have the demerit that a pressure loss increases. Furthermore, the mat is wound around the ceramic catalyst carrier, and hence, even when a structure to emit the exhaust gas through the circumference of the carrier is employed, an effect of the ceramic catalyst carrier is deteriorated by the mat.

The present invention has been developed in view of such problems of the conventional technologies, and objects of the present invention are to provide an exhaust gas treating device which can be downsized as a whole and which is easily heated and hard to be rapidly cooled, and to provide a manufacturing method of a honeycomb structure.

According to the present invention, there are provided an exhaust gas treating device and a manufacturing method of a honeycomb structure as mentioned below.

According to a first aspect of the present invention, an exhaust gas treating device is provided including a honeycomb structure having porous partition walls defining a plurality of cells extending from a first end face which is one end face to a second end face which is the other end face; and a can member which stores the honeycomb structure, wherein the honeycomb structure includes an inner honeycomb structure body including a honeycomb substrate having porous inner partition walls defining the plurality of cells extending from an inner inflow end face which is the end face on the side of the first end face to an inner outflow end face which is the end face on the side of the second end face and a circumferential wall disposed at a circumference of the honeycomb substrate, an outer honeycomb structure body disposed at a position which surrounds a part of a circumference of the inner honeycomb structure body and is away from the inner inflow end face of the inner honeycomb structure body, the outer honeycomb structure body has porous outer partition walls defining the plurality of cells extending from an outer inflow end face which is the end face on the side of the second end face to an outer outflow end face which is the end face on the side of the first end face, and plugging portions arranged in parts of the cells, the can member includes an inflow tube which fits with an end portion of the inner honeycomb structure body on the side of the inner inflow end face and in which an inlet of an exhaust gas is formed, and a barrel portion which is continuous with the inflow tube, and in the barrel portion, an outlet of the exhaust gas is formed at a position between the inner inflow end face of the inner honeycomb structure body and the outer outflow end face of the outer honeycomb structure body, and the honeycomb structure is stored in the can member in a state of having a clearance which serves as a through channel for the exhaust gas between the second end face and the can member and having a clearance which serves as a through channel for the exhaust gas between the outer outflow end face of the outer honeycomb structure body and the can member.

According to a second aspect of the present invention, the exhaust gas treating device according to the above first aspect is provided, wherein the plugging portions are not arranged in the inner honeycomb structure body or are arranged only in one end portion of the inner honeycomb structure body, and the plugging portions are arranged only in one of end portions of the outer honeycomb structure body or are arranged in both of the end portions.

According to a third aspect of the present invention, the exhaust gas treating device according to the above second aspect is provided, wherein the plugging portions are arranged in end portions of the predetermined cells on the side of the outer inflow end face and end portions of the residual cells on the side of the outer outflow end face among the cells of the outer honeycomb structure body, and the plugging portions are not arranged in the inner honeycomb structure body.

According to a fourth aspect of the present invention, the exhaust gas treating device according to the above second aspect is provided, wherein the plugging portions are arranged in parts of end portions of the inner honeycomb structure body on the side of any one of the inner inflow end face and the inner outflow end face.

According to a fifth aspect of the present invention, the exhaust gas treating device according to any one of the above first to fourth aspects is provided, wherein a thickness of the outer partition walls of the outer honeycomb structure body is larger than a thickness of the inner partition walls of the inner honeycomb structure body.

According to a sixth aspect of the present invention, the exhaust gas treating device according to any one of the above first to fifth aspects is provided, wherein a cell density of the outer honeycomb structure body is smaller than a cell density of the inner honeycomb structure body.

According to a seventh aspect of the present invention, the exhaust gas treating device according to any one of the above first to sixth aspects is provided, wherein the circumferential wall of the inner honeycomb structure body is formed integrally with the inner partition walls of the inner honeycomb structure body.

According to an eighth aspect of the present invention, the exhaust gas treating device according to any one of the above first to seventh aspects is provided, wherein in the can member, an outlet for EGR which connects with a route to recirculate the exhaust gas is formed at a position between the inner inflow end face of the inner honeycomb structure body and the outer outflow end face of the outer honeycomb structure body.

According to a ninth aspect of the present invention, the exhaust gas treating device according to any one of the above first to eighth aspects is provided, wherein a sound absorbing material is disposed in a clearance between the second end face of the honeycomb structure and the can member.

According to a tenth aspect of the present invention, a manufacturing method of a honeycomb structure is provided including a honeycomb formed body preparing step of preparing a honeycomb formed body including partition walls defining a plurality of cells extending from an inflow end face which is one end face to an outflow end face which is the other end face, and a dividing wall which divides a cross section perpendicular to an extending direction of the cells into an outer portion and an inner portion; a plugging arrangement step of charging end portions of parts of the cells of the prepared honeycomb formed body with a plugging slurry to arrange plugging portions, thereby obtaining a plugged honeycomb formed body; a firing step of firing the prepared plugged honeycomb formed body to obtain a honeycomb fired body; and a honeycomb structure preparing step of grinding a part of the outer portion of the honeycomb fired body from the one end face to expose a part of the dividing wall, thereby obtaining the honeycomb structure.

An exhaust gas treating device of the present invention includes a predetermined honeycomb structure and a predetermined can member which stores this honeycomb structure, and hence the device can be downsized as a whole. Furthermore, this allows the exhaust gas treating device of the present invention to be easily heated and hard to be rapidly cooled due to the above constitution.

A manufacturing method of the honeycomb structure of the present invention can suitably provide the honeycomb structure which is usable in the exhaust gas treating device of the present invention.

DESCRIPTION OF THE PREFERRED EMBODIMENTS

Hereinafter, embodiments of the present invention will be described. It is to be understood that the present invention is not limited to the following embodiments, and changes, improvements and the like suitably added to the following embodiments on the basis of ordinary knowledge of a person skilled in the art without departing from the gist of the present invention also fall in the scope of the present invention.

Figure 1:
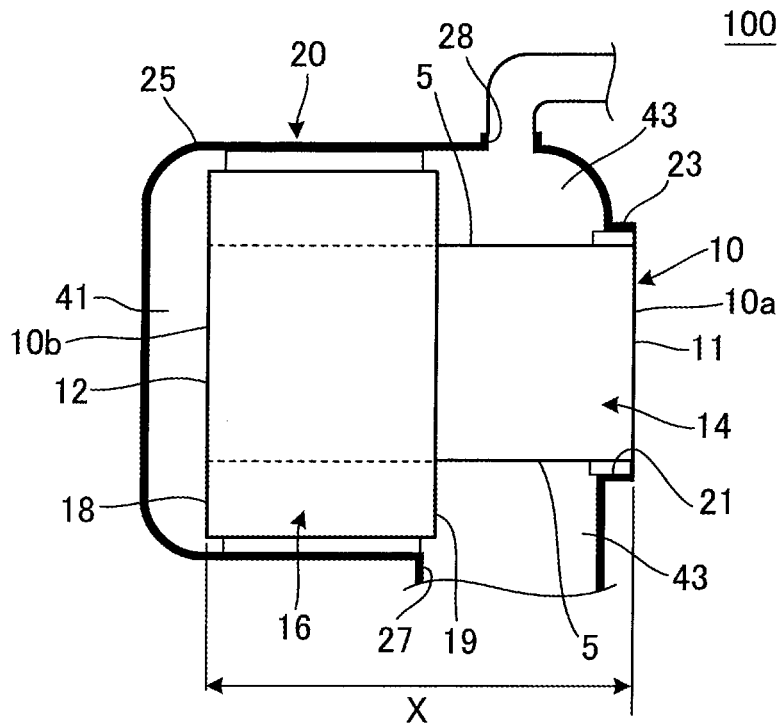
FIG. 1 is a cross-sectional view schematically showing a cross section of one embodiment of an exhaust gas treating device of the present invention.
Figure 3:
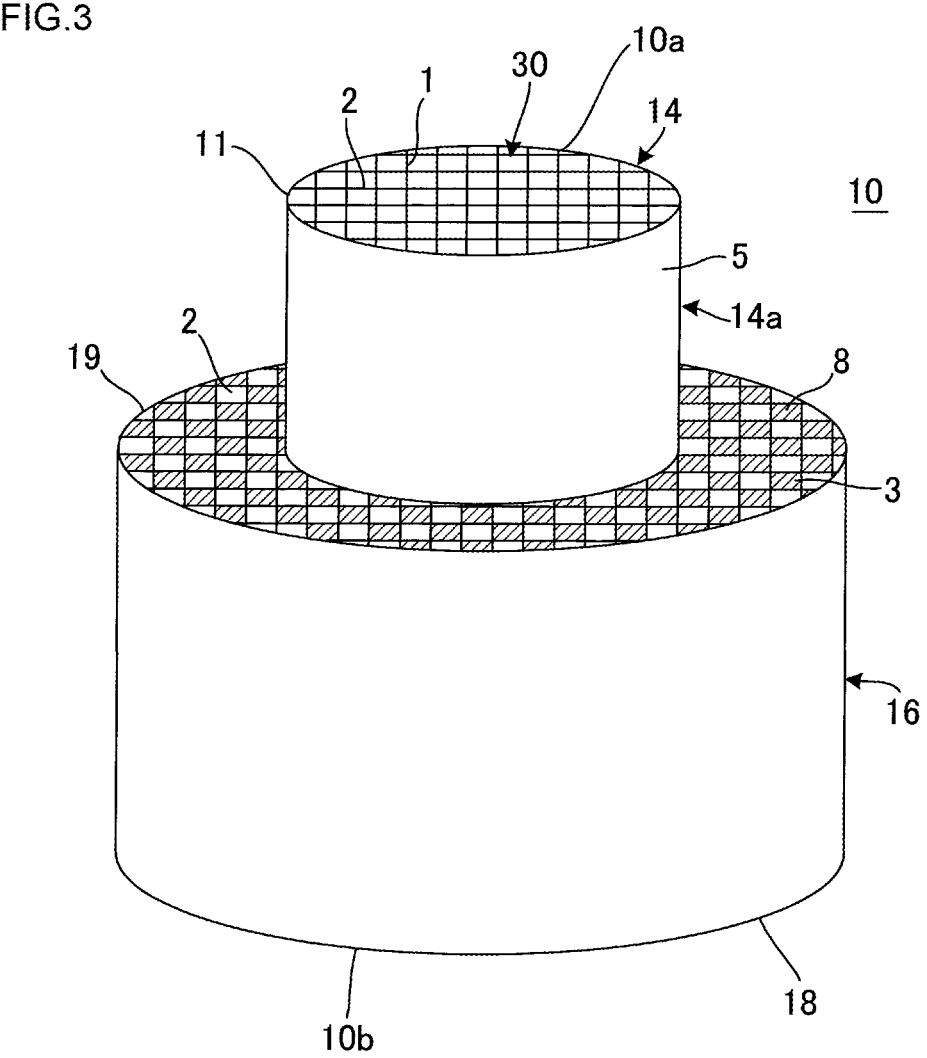
FIG. 3 is a perspective view schematically showing a honeycomb structure included in one embodiment of the exhaust gas treating device of the present invention.

[1] Exhaust Gas Treating Device:

One embodiment of an exhaust gas treating device of the present invention is an exhaust gas treating device 100 shown in FIG. 1. The exhaust gas treating device 100 includes a honeycomb structure 10, and a can member 20 which stores the honeycomb structure 10 and serves as a passage of an exhaust gas. Further, as shown in FIG. 3, the honeycomb structure 10 includes an inner honeycomb structure body 14, an outer honeycomb structure body 16 positioned on an outer side of this inner honeycomb structure body, and plugging portions 8.

The honeycomb structure 10 includes the inner honeycomb structure body 14 having a honeycomb substrate 30 and a circumferential wall 5 disposed at a circumference of the honeycomb substrate 30. The honeycomb substrate 30 has porous inner partition walls 1 defining a plurality of cells 2 extending from an inner inflow end face 11 which is the end face on the side of a first end face 10a to an inner outflow end face 12 which is the end face on the side of a second end face 10b (see FIG. 3). Furthermore, the honeycomb structure 10 has the outer honeycomb structure body 16 disposed at a position which surrounds a part of a circumference of the inner honeycomb structure body 14 and is away from the inner inflow end face 11 of the inner honeycomb structure body 14. The plugging portions 8 are arranged in parts of the cells 2 (see FIG. 3). The can member 20 has an inflow tube 23 which fits with an end portion of the inner honeycomb structure body 14 on the side of the inner inflow end face 11 and in which an inlet 21 of the exhaust gas is formed, and a barrel portion 25 which is continuous with the inflow tube 23. Further in the barrel portion 25, an outlet 27 of the exhaust gas is formed at a position between the inner inflow end face 11 of the inner honeycomb structure body 14 and an outer outflow end face 19 of the outer honeycomb structure body 16. The honeycomb structure 10 is stored in the can member 20 in a state of having a clearance (hereinafter also referred to as "a return space" sometimes) 41 which serves as a through channel for the exhaust gas between the second end face 10b and the can member 20 and having a clearance (a space which will hereinafter be referred to also as "a temperature raising assistance space" sometimes) 43 which serves as a through channel for the exhaust gas between the outer outflow end face 19 of the outer honeycomb structure body 16 and the can member 20.

In this way, the exhaust gas treating device 100 includes the honeycomb structure 10 and the can member 20 which stores the honeycomb structure 10. This allows the exhaust gas treating device 100 to be downsized as a whole, and to be easily heated and hard to be rapidly cooled.

Figure 2:
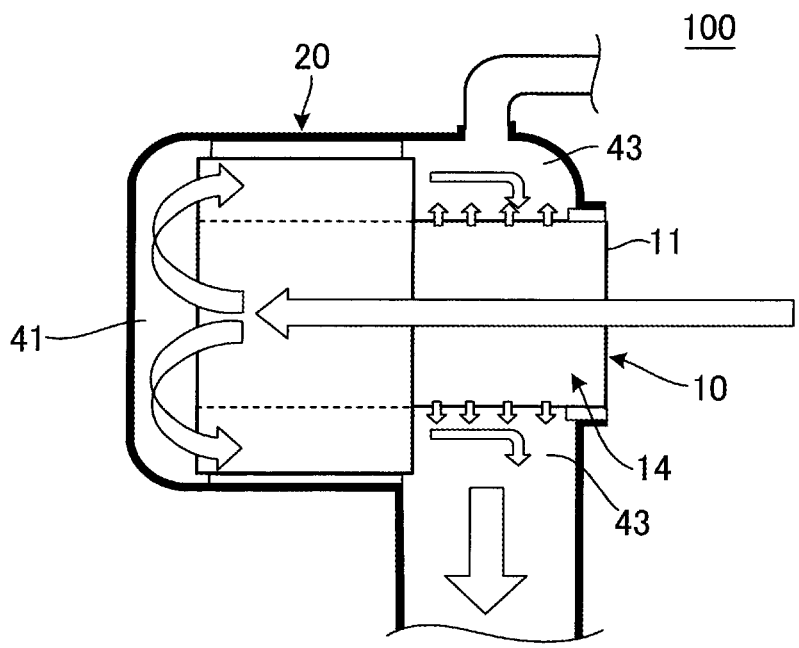
FIG. 2 is an explanatory view schematically showing a flow of an exhaust gas in one embodiment of the exhaust gas treating device of the present invention.

In the exhaust gas treating device 100, as shown in FIG. 2, the exhaust gas flows into the honeycomb structure 10 from the side of the inner inflow end face 11 of the inner honeycomb structure body 14 of the honeycomb structure 10, and flows out from the inner outflow end face 12 of the inner honeycomb structure body 14. Afterward, the exhaust gas flowing into the return space 41 flows into the outer honeycomb structure body 16 from the side of an outer inflow end face 18 of the outer honeycomb structure body 16, and flows out from the outer outflow end face 19. At this time, the exhaust gas flowing out from the outer outflow end face 19 of the outer honeycomb structure body 16 is introduced into the temperature raising assistance space 43 which is the space between the circumferential wall 5 of the inner honeycomb structure body 14 and the barrel portion 25 of the can member 20. Afterward, the above-mentioned exhaust gas is emitted from the outlet 27 of the can member 20 while coming into contact with the circumferential wall 5. It is to be noted that the exhaust gas flowing inside from the side of the inner inflow end face 11 of the inner honeycomb structure body 14 flows out to the temperature raising assistance space 43 as it is without flowing out from the inner outflow end face 12. Note that the arrow in FIG. 2 illustrates the flow of the exhaust gas.

That is, the exhaust gas emitted from the outer honeycomb structure body 16 directly hits on the circumferential wall 5 of the inner honeycomb structure body 14. Therefore, a portion on which the exhaust gas directly hits (an after-mentioned convex portion 14a) is heated from its outside by the above exhaust gas. Therefore, the exhaust gas treating device 100 is easily heated and hard to be rapidly cooled. Further, the exhaust gas flows along such a route as described above in the can member 20, and this allows the exhaust gas treating device 100 to be downsized as a whole. It is to be noted that in a state where a catalyst is not applied, the exhaust gas directly hitting on the circumferential wall 5 passes through the honeycomb structure 10, and hence a temperature of the exhaust gas becomes lower than that of the exhaust gas first flowing into the honeycomb structure 10. However, in a state where the catalyst is applied, the temperature of the exhaust gas can be raised to be higher than the temperature of the exhaust gas flowing inside by heat generated in a catalytic reaction. Therefore, it is possible to promote the temperature raising of the honeycomb structure 10 as described above. Furthermore, when a cooled gas (the exhaust gas having its temperature lowered in an idling state or a situation where a car descends along a slope) flows into the honeycomb structure 10, this exhaust gas (the cooled gas) is warmed while passing through the honeycomb structure 10. Further, the warmed exhaust gas has a temperature to such an extent that the temperature of the honeycomb structure is prevented from being lowered by the exhaust gas hitting on the circumferential wall 5.

FIG. 1 is a cross-sectional view schematically showing a cross section of one embodiment of an exhaust gas treating device of the present invention. FIG. 2 is an explanatory view schematically showing a flow of an exhaust gas in one embodiment of the exhaust gas treating device of the present invention. FIG. 3 is a perspective view schematically showing a honeycomb structure included in one embodiment of the exhaust gas treating device of the present invention.

[1-1] Honeycomb Structure:

An example of the honeycomb structure of the exhaust gas treating device of the present invention is the honeycomb structure 10 shown in FIG. 3. As shown in FIG. 3, it can be considered that the honeycomb structure 10 has a pillar-shape having the portion convexly projecting from a center of one end face (the convex portion 14a).

The outer honeycomb structure body 16 is disposed at a position away from the inner inflow end face 11 of the inner honeycomb structure body 14. Specifically, the position of the outer honeycomb structure body 16 from the inner inflow end face 11 is preferably from 10 to 60% and further preferably from 20 to 50% of a total length of the honeycomb structure in a cell extending direction. When the length ratio is in such a range, the honeycomb structure can be held in the can member while improving a temperature raising performance. In other words, the length ratio of the above convex portion of the honeycomb structure in the cell extending direction is preferably in the above range.

An area of the inner inflow end face 11 is preferably from 5 to 50% and further preferably from 10 to 40% of a total area of the inner inflow end face 11 and the outer outflow end face 19. When the area ratio is in such a range, an area of a portion which functions as a filter can be acquired. Furthermore, a pressure loss of the exhaust gas treating device can be decreased.

An average pore diameter of each of the partition walls (the inner partition walls and outer partition walls) and the circumferential wall is preferably from 5 to 30 μm and further preferably from 9 to 25 μm. When the average pore diameter is in such a range, closing of pores by the catalyst or PM can be suppressed. Furthermore, the pressure loss can be reduced. This average pore diameter is a value measured by a mercury porosimeter.

A porosity of each of the partition walls (the inner partition walls and the outer partition walls) and the circumferential wall is preferably from 35 to 70% and further preferably from 40 to 65%. When the porosity is in such a range, an isostatic strength can be acquired so that the honeycomb structure can be canned while decreasing a permeation resistance in a case where the exhaust gas permeates the partition walls. This porosity is a value measured by the mercury porosimeter.

There is not any special restriction on a thickness of the partition walls (the inner partition walls and the outer partition walls). The thickness of the partition walls is, for example, preferably from 64 to 305 μm. When the thickness of the partition walls is smaller than 64 μm, it is likely that an isostatic strength remarkably would deteriorate and the honeycomb structure would be broken during the canning. On the other hand, when the thickness is in excess of 305 μm, it is likely that a noticeable increase of the pressure loss would bring about, for example, the adverse effects that a fuel efficiency deteriorates and that an output cannot sufficiently be obtained. Furthermore, the thickness of the inner partition walls may be different from that of the outer partition walls. It is preferable that the thickness of the outer partition walls of the outer honeycomb structure body is larger than the thickness of the inner partition walls of the inner honeycomb structure body. Specifically, a ratio of the thickness of the outer partition walls to the thickness of the inner partition walls (the thickness of the outer partition walls/the thickness of the inner partition walls) is preferably from 1.1 to 5.0 and further preferably from 11 to 3.5. In this case, a heat capacity of the inner honeycomb structure body can be decreased to improve the temperature raising performance of the catalyst, and furthermore, a trapping performance can be improved by increasing the thickness of the partition walls of the outer honeycomb structure body. On the other hand, when the ratio of the thickness of the outer partition walls to the thickness of the inner partition walls (the thickness of the outer partition walls/the thickness of the inner partition walls) is in excess of 5.0, a large difference is made in extrusion rate between each outer partition wall and each inner partition wall during extrusion of the honeycomb structure. Consequently, it is likely that the partition walls would be deformed in a boundary portion between the outer partition wall and the inner partition wall to deteriorate the isostatic strength.

The thickness of the outer partition walls is, for example, preferably from 110 to 381 μm and further preferably from 152 to 305 μm.

There is not any special restriction on the thickness of the circumferential wall. The thickness is, for example, preferably from 0.3 to 3 mm. When the thickness of the circumferential wall is smaller than 0.3 mm, it is likely that small holes or cracks would be easily generated in the circumferential wall, and the catalyst would leak from the circumferential wall during the applying of the catalyst. On the other hand, when the thickness is in excess of 3 mm, a flow of a kneaded material which forms the circumferential wall is faster than that of a kneaded material which forms another portion during the extrusion of the honeycomb structure. Therefore, it is likely that a difference in flow would be made between the circumferential wall and the adjacent partition wall (the inner partition wall or the outer partition wall), and the partition walls would be deformed to remarkably deteriorate the isostatic strength.

It is preferable that the circumferential wall of the inner honeycomb structure body is formed integrally with the inner partition walls of the inner honeycomb structure body. This allows a difference in thermal expansion between the circumferential wall and each inner partition wall to be reduced, and a structure to be excellent in thermal shock resistance. Here, when the circumferential wall is "formed integrally with the inner partition walls", it is not meant that the circumferential wall and the inner partition wall are fixed to each other by a method such as bonding, but it is meant that, for example, the circumferential wall is formed integrally with the inner partition walls during the extrusion in a manufacturing stage.

There is not any special restriction on a cell density of the honeycomb structure. Here, it is preferable that the cell density of the outer honeycomb structure body is smaller than the cell density of the inner honeycomb structure body. Specifically, the cell density of the inner honeycomb structure body is preferably from 46.5 to 186 cells/cm$^2$ and the cell density of the outer honeycomb structure body is preferably from 7.7 to 46.5 cells/cm$^2$. This allows the inner honeycomb structure body to acquire a geometric surface area to improve a purifying performance of the exhaust gas, and the outer honeycomb structure body to reduce the pressure loss.

As a material of the honeycomb structure, a ceramic material is preferable, the ceramic material is excellent in strength and heat resistance, and examples of the material include silicon carbide, cordierite, aluminum titanate, a silicon-silicon carbide based composite material, a silicon carbide-cordierite based composite material, mullite, alumina, and silicon nitride. The material is preferably at least one selected from the group consisting of silicon carbide, cordierite, aluminum titanate, the silicon-silicon carbide based composite material, and the silicon carbide-cordierite based composite material.

Furthermore, the honeycomb structure may be a bonded body including a plurality of honeycomb segments (a honeycomb segment bonded body). That is, the honeycomb structure may include an assembly of the plurality of honeycomb segments, and bonding portions made of a bonding material to bond these honeycomb segments to one another.

The plugging portions are arranged in parts of the cells in at least one of the inner honeycomb structure body and the outer honeycomb structure body. A material of these plugging portions can be similar to the above-mentioned material of the honeycomb structure. Furthermore, a depth of each plugging portion can suitably be determined.

As arrangement patterns of the plugging portions, such patterns (1) to (7) as mentioned below are preferably employed.

Figure 4A:
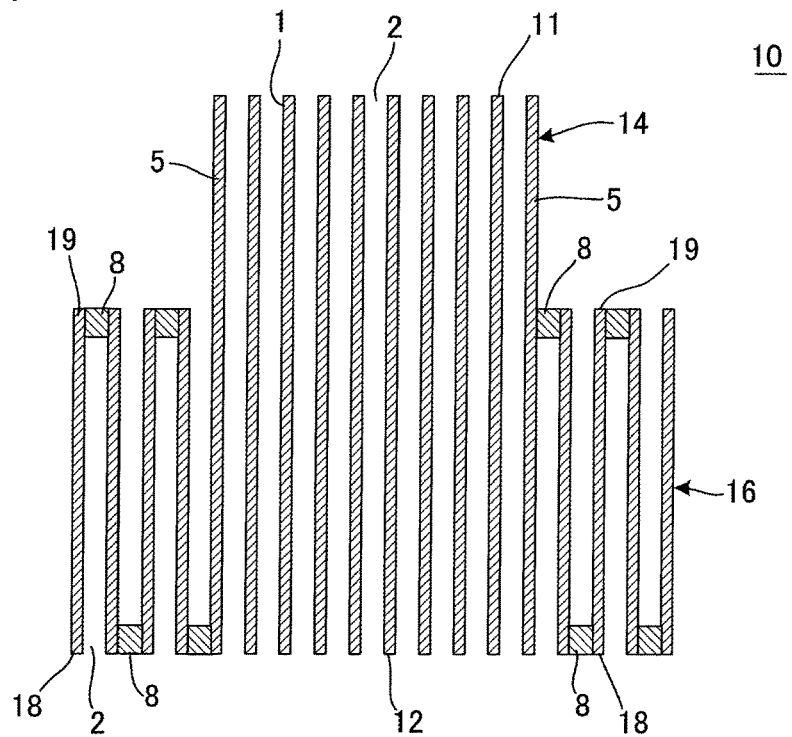
FIG. 4A is an explanatory view to explain an arrangement pattern of plugging portions in the honeycomb structure included in one embodiment of the exhaust gas treating device of the present invention.

(1) As shown in FIG. 4A, the plugging portions 8 are arranged in end portions of predetermined cells on the side of the outer inflow end face 18 and end portions of the residual cells on the side of the outer outflow end face 19 among the cells 2 of the outer honeycomb structure body 16, and the plugging portions are not arranged in the inner honeycomb structure body 14.

Figure 4B:
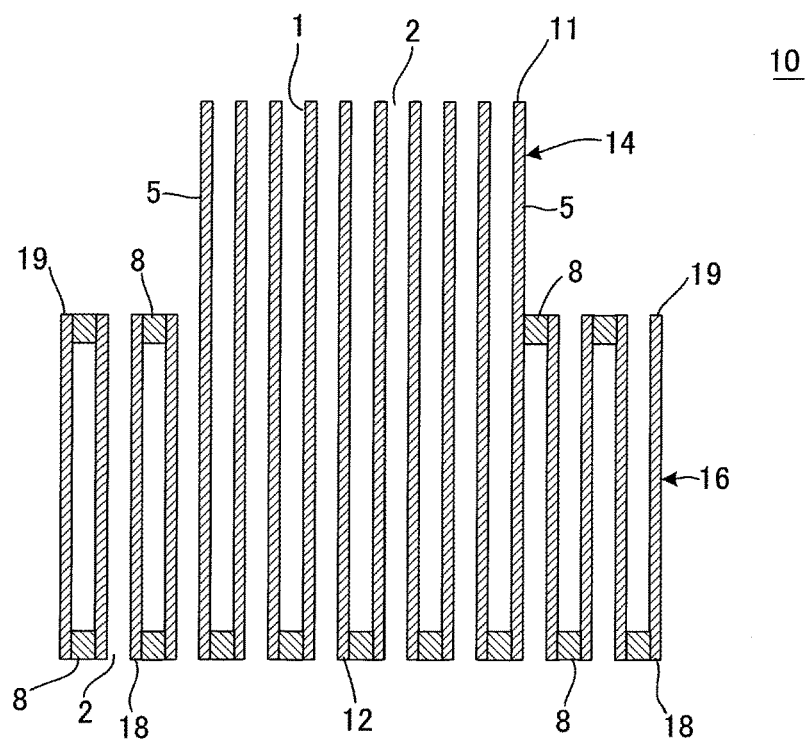
FIG. 4B is an explanatory view to explain an arrangement pattern of plugging portions in a honeycomb structure included in another embodiment of the exhaust gas treating device of the present invention.

(2) As shown in FIG. 4B, the plugging portions 8 are arranged in end portions of predetermined cells on the side of the outer inflow end face 18 and end portions of the residual cells on the side of the outer outflow end face 19 among the cells 2 of the outer honeycomb structure body 16. Further, the plugging portions 8 are arranged only in end portions of predetermined cells on the side of the inner outflow end face 12 in the inner honeycomb structure body 14. The plugging portions are not arranged in end portions of the residual cells on the side of the inner inflow end face 11 in the inner honeycomb structure body 14.

Figure 4C:
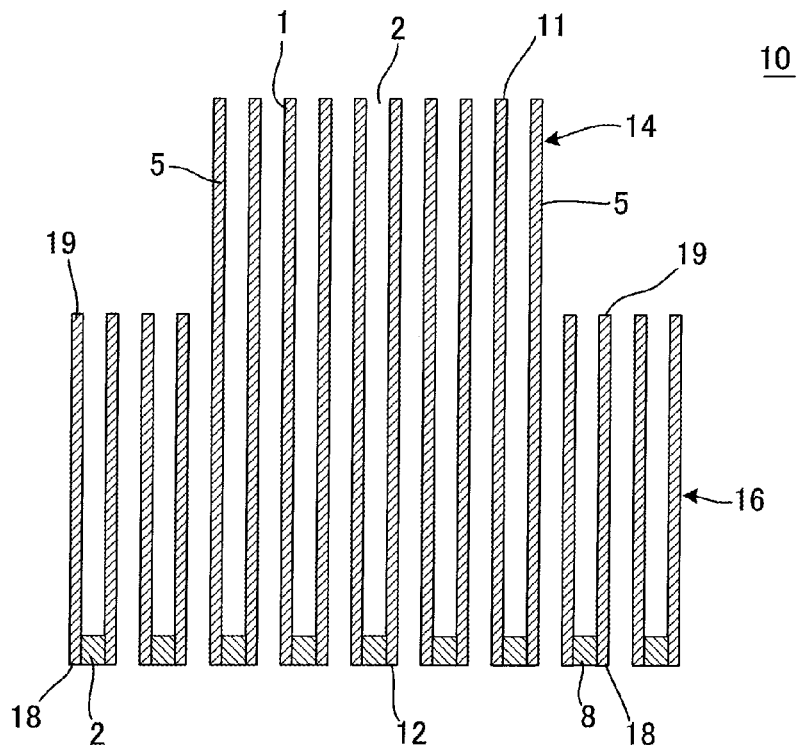
FIG. 4C is an explanatory view to explain an arrangement pattern of plugging portions in a honeycomb structure included in still another embodiment of the exhaust gas treating device of the present invention.

(3) As shown in FIG. 4C, the plugging portions 8 are arranged only in end portions of predetermined cells on the side of the inner outflow end face 12 in the inner honeycomb structure body 14. The plugging portions 8 are arranged only in end portions of predetermined cells on the side of the outer inflow end face 18 in the outer honeycomb structure body 16. The plugging portions 8 are not arranged in end portions of the residual cells on the side of the inner inflow end face 11 in the inner honeycomb structure body 14, and the plugging portions are not arranged in end portions of the residual cells on the side of the outer outflow end face 19 in the outer honeycomb structure body 16.

Figure 4D:
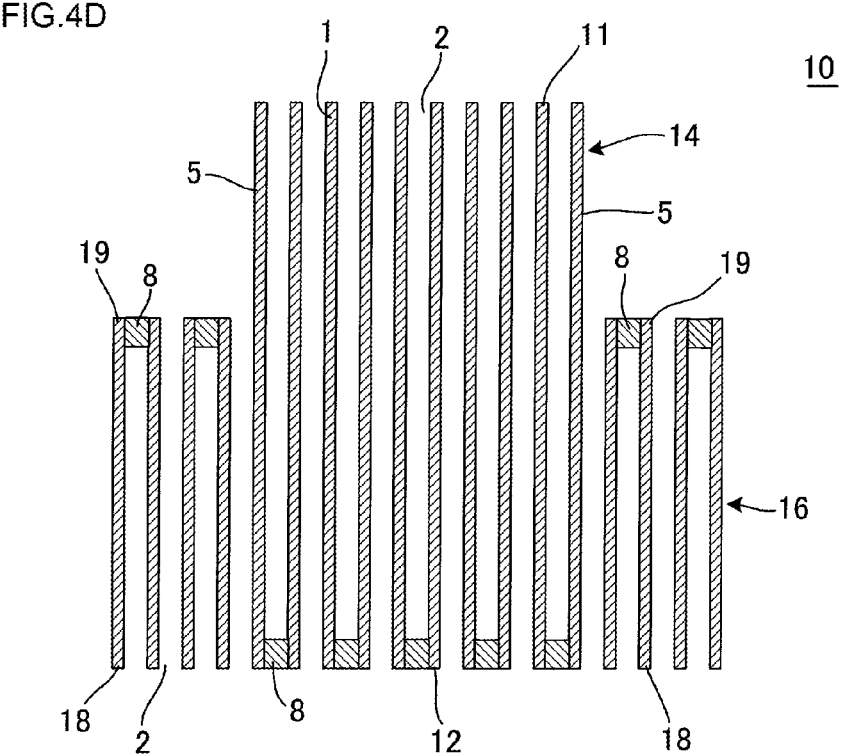
FIG. 4D is an explanatory view to explain an arrangement pattern of plugging portions in a honeycomb structure included in still another embodiment of the exhaust gas treating device of the present invention.

(4) As shown in FIG. 4D, the plugging portions 8 are arranged only in end portions of predetermined cells on the side of the inner outflow end face 12 in the inner honeycomb structure body 14. The plugging portions 8 are arranged only in end portions of predetermined cells on the side of the outer outflow end face 19 in the outer honeycomb structure body 16. The plugging portions 8 are not arranged in end portions of the residual cells on the side of the inner inflow end face 11 in the inner honeycomb structure body 14, and the plugging portions are not arranged in end portions of the residual cells on the side of the outer inflow end face 18 in the outer honeycomb structure body 16.

Figure 4E:
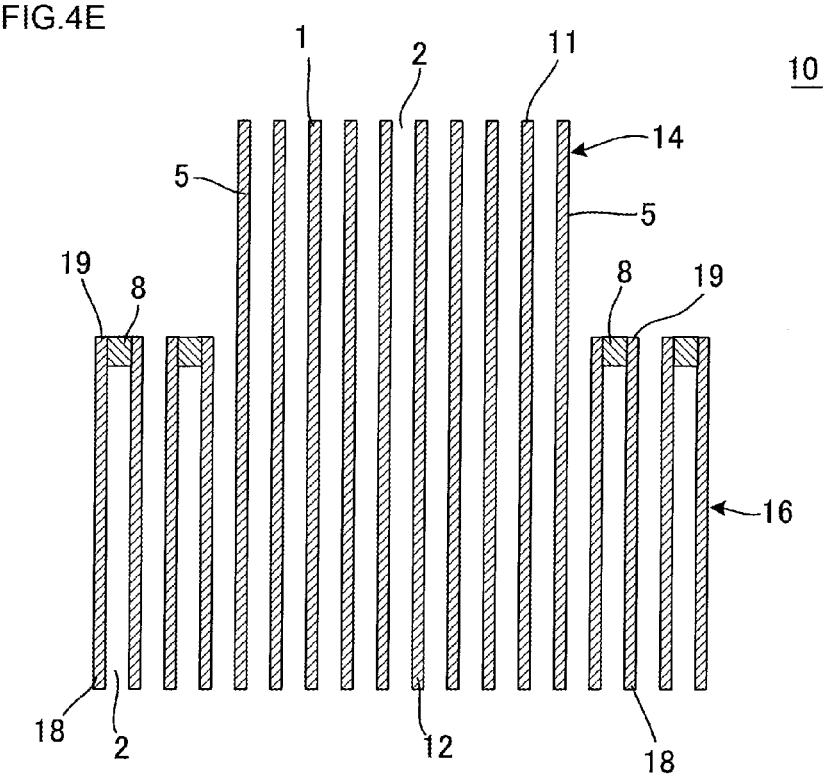
FIG. 4E is an explanatory view to explain an arrangement pattern of plugging portions in a honeycomb structure included in still another embodiment of the exhaust gas treating device of the present invention.

(5) As shown in FIG. 4E, the plugging portions 8 are arranged only in end portions of predetermined cells on the side of the outer outflow end face 19 in the outer honeycomb structure body 16, and are not arranged in the inner honeycomb structure body 14. In the outer honeycomb structure body 16, the plugging portions are not arranged in end portions of the residual cells on the side of the outer inflow end face 18.

Figure 4F:
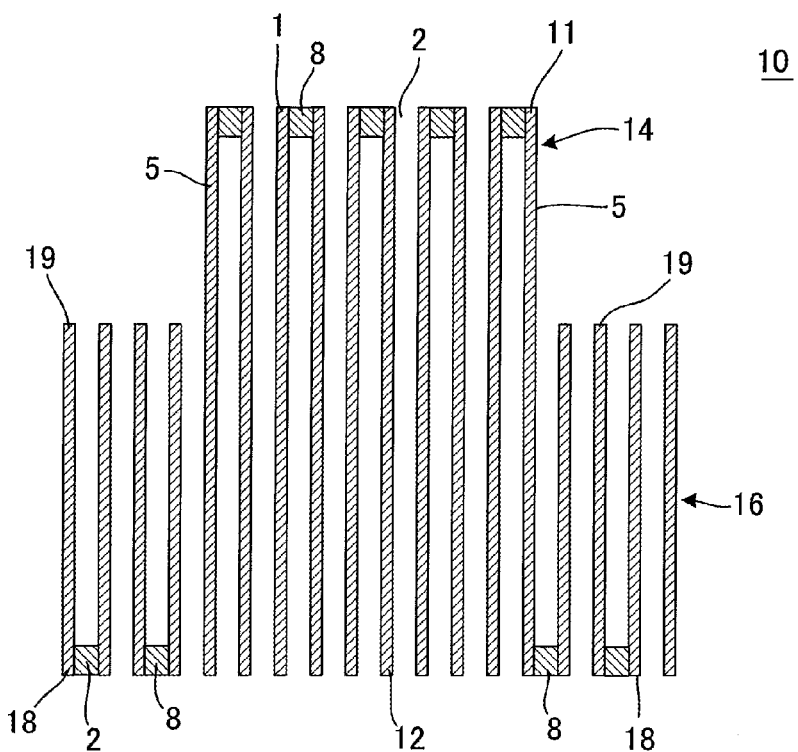
FIG. 4F is an explanatory view to explain an arrangement pattern of plugging portions in a honeycomb structure included in still another embodiment of the exhaust gas treating device of the present invention.

(6) As shown in FIG. 4F, the plugging portions 8 are arranged only in end portions of predetermined cells on the side of the inner inflow end face 11 in the inner honeycomb structure body 14. Further, the plugging portions 8 are arranged only in end portions of predetermined cells on the side of the outer inflow end face 18 in the outer honeycomb structure body 16. The plugging portions 8 are not arranged in end portions of the residual cells on the side of the inner outflow end face 12 in the inner honeycomb structure body 14, and are not arranged in end portions of the residual cells on the side of the outer outflow end face 19 in the outer honeycomb structure body 16.

Figure 4G:
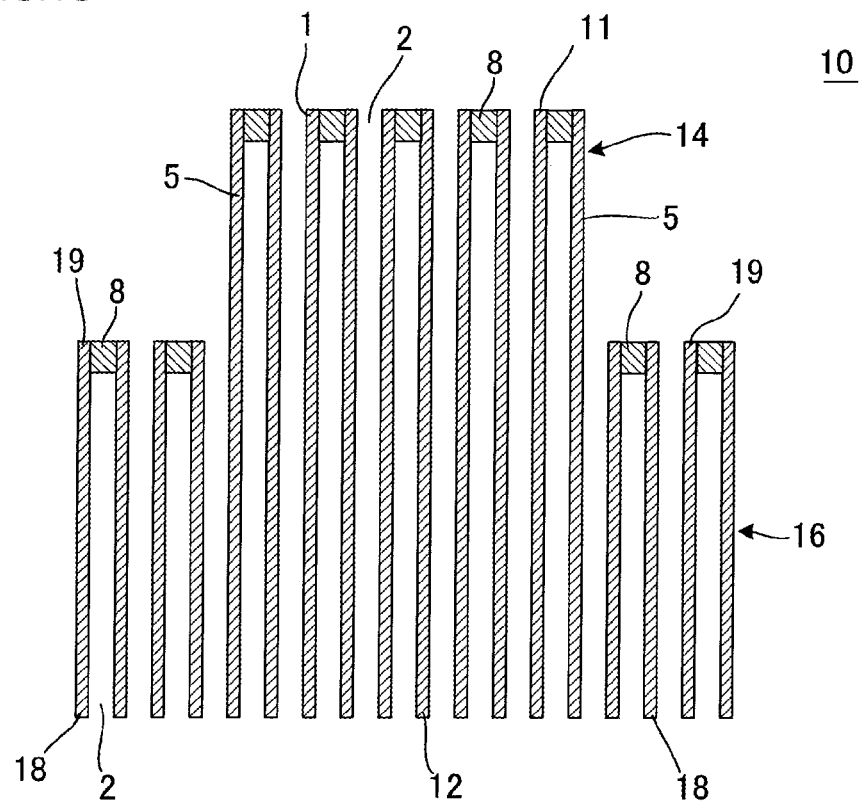
FIG. 4G is an explanatory view to explain an arrangement pattern of plugging portions in a honeycomb structure included in still another embodiment of the exhaust gas treating device of the present invention.

(7) As shown in FIG. 4G, the plugging portions 8 are arranged only in end portions of predetermined cells on the side of the inner inflow end face 11 in the inner honeycomb structure body 14. Further, the plugging portions 8 are arranged only in end portions of predetermined cells on the side of the outer outflow end face 19 in the outer honeycomb structure body 16. The plugging portions 8 are not arranged in end portions of the residual cells on the side of the inner outflow end face 12 in the inner honeycomb structure body 14, and are not arranged in end portions of the residual cells on the side of the outer inflow end face 18 in the outer honeycomb structure body 16.

FIG. 4A is an explanatory view to explain the arrangement pattern of the plugging portions in the honeycomb structure included in one embodiment of the exhaust gas treating device of the present invention. FIG. 4B is an explanatory view to explain an arrangement pattern of plugging portions in a honeycomb structure included in another embodiment of the exhaust gas treating device of the present invention. FIG. 4C is an explanatory view to explain an arrangement pattern of plugging portions in a honeycomb structure included in still another embodiment of the exhaust gas treating device of the present invention. FIG. 4D is an explanatory view to explain an arrangement pattern of plugging portions in a honeycomb structure included in still another embodiment of the exhaust gas treating device of the present invention. FIG. 4E is an explanatory view to explain an arrangement pattern of plugging portions in a honeycomb structure included in still another embodiment of the exhaust gas treating device of the present invention. FIG. 4F is an explanatory view to explain an arrangement pattern of plugging portions in a honeycomb structure included in still another embodiment of the exhaust gas treating device of the present invention. FIG. 4G is an explanatory view to explain an arrangement pattern of plugging portions in a honeycomb structure included in still another embodiment of the exhaust gas treating device of the present invention.

[1-2] Can Member:

As described above, the can member 20 includes the inflow tube 23 which fits with the end portion of the inner honeycomb structure body 14 on the side of the inner inflow end face 11 and in which the inlet 21 of the exhaust gas is formed, and the barrel portion 25 which is continuous with the inflow tube 23. Further in the barrel portion 25, the outlet 27 of the exhaust gas is formed at the position between the inner inflow end face 11 of the inner honeycomb structure body 14 and the outer outflow end face 19 of the outer honeycomb structure body 16. The can member 20 allows the exhaust gas flowing into the exhaust gas treating device 100 to flow as shown by the arrows in FIG. 2. That is, the exhaust gas emitted from the outer honeycomb structure body 16 directly hits on the circumferential wall 5 of the inner honeycomb structure body 14. Therefore, the convex portion 14a is heated from its outside by the above exhaust gas and then, the exhaust gas treating device 100 is easily heated and hard to be rapidly cooled. Furthermore, the exhaust gas flows along the above-mentioned route in the can member 20, and hence the exhaust gas treating device 100 can be downsized as a whole.

In the exhaust gas treating device of the present invention, the outlet is formed at the above position of the barrel portion of the can member, and hence the exhaust gas passing through the honeycomb structure flows to directly hit on a circumference of the above convex portion of the inner honeycomb structure body. Therefore, the exhaust gas treating device of the present invention is kept warm by the exhaust gas, and the honeycomb structure is easily heated and hard to be rapidly cooled.

A width in the return space 41 (i.e., a distance between the honeycomb structure 10 and an inner surface of the can member 20) is preferably from 20 to 150 mm and further preferably from 30 to 100 mm. When the width is in such ranges, the through channel of the exhaust gas can be acquired to suppress the increase of the pressure loss.

It is preferable that in the can member 20, an outlet 28 for EGR which connects with a route to recirculate the exhaust gas is formed at a position between the inner inflow end face 11 of the inner honeycomb structure body 14 and the outer outflow end face 19 of the outer honeycomb structure body 16. In this way, when the can member 20 is coupled with the route to recirculate the exhaust gas, the exhaust gas from which soot is trapped can be supplied for the EGR, and hence clogging with the soot in an EGR cooler or the like can be suppressed. Furthermore, a part of the exhaust gas is supplied from the circumferential wall 5 to the space between the inner inflow end face 11 of the inner honeycomb structure body 14 and the outer outflow end face 19 of the outer honeycomb structure body 16, and hence a pressure of the exhaust gas in the outlet 28 for EGR can be kept comparatively high. As a result, an amount of the exhaust gas to be supplied for the EGR can be acquired. It is to be noted that the EGR is an abbreviation for Exhaust Gas Recirculation.

A material of the can member 20 can be the same material as in a can member to be employed in a heretofore known exhaust gas treating device.

[1-3] Sound Absorbing Material:

In the exhaust gas treating device of the present invention, it is preferable that a sound absorbing material is disposed in a clearance between the second end face of the honeycomb structure and the can member. The sound absorbing material is a mat made of glass fibers or the like and having heat resistance. Thus, the sound absorbing material is disposed as described above, so that the same silencing effect as in a muffler can be obtained.

Examples of the sound absorbing material include glass wool and metal fibers. Above all, the glass wool is preferable from a viewpoint of having the heat resistance.

[2] Manufacturing Method of Honeycomb Structure:

A manufacturing method of the honeycomb structure includes a honeycomb formed body preparing step of preparing a honeycomb formed body; a plugging arrangement step of forming plugging portions in the prepared honeycomb formed body; a firing step of firing the prepared plugged honeycomb formed body to obtain a honeycomb fired body; and a honeycomb structure preparing step of exposing a part of a dividing wall, thereby obtaining the honeycomb structure. The honeycomb formed body in the honeycomb formed body preparing step includes partition walls defining a plurality of cells extending from an inflow end face which is one end face to an outflow end face which is the other end face, and the dividing wall which divides a cross section perpendicular to an extending direction of the cells into an outer portion and an inner portion. In the honeycomb structure preparing step, a part of an outer portion of the honeycomb fired body obtained in the firing step is ground from the one end face to expose a part of the dividing wall.

Such a manufacturing method can suitably provide the honeycomb structure which is usable in the exhaust gas treating device of the present invention. Specifically, in the present manufacturing method, the honeycomb formed body having the dividing wall is prepared in the honeycomb formed body preparing step, this honeycomb formed body is fired to obtain the honeycomb fired body, and then the honeycomb fired body is ground to expose the dividing wall (the circumferential wall). This allows the circumferential wall (the dividing wall) to be disposed at the circumference of the end portion of the obtained honeycomb structure on the side of the inner inflow end face. That is, when the dividing wall is not disposed in the honeycomb formed body preparing step, the ground partition walls are exposed in the honeycomb structure. Further, parts of the partition walls peel off.

The honeycomb structure having the circumferential wall (the dividing wall) can prevent from peeling off parts of the partition walls. Furthermore, in the above manufacturing method, the end portion of the honeycomb structure on the side of the inner inflow end face (the convex portion of the inner honeycomb structure body) is ground outside, and the end portion having the circumferential wall on the side of the inner inflow end face (the convex portion of the inner honeycomb structure body) can easily be prepared.

[2-1] Honeycomb Formed Body Preparing Step:

Specifically, in the present step, a forming raw material is first kneaded to obtain a kneaded material. The forming raw material is preferably obtained by adding a dispersing medium and an additive to a ceramic raw material. Examples of the additive include an organic binder, a pore former, and a surfactant or the like. An example of the dispersing medium is water or the like.

It is preferable that the ceramic raw material is at least one selected from the group consisting of a cordierite forming raw material, mullite, alumina, spinel, silicon carbide, a silicon-silicon carbide based composite material, a silicon carbide-cordierite based composite material, lithium aluminum silicate, and aluminum titanate. Above all, the cordierite forming raw material is preferable because this material has a smaller thermal expansion coefficient and is excellent in thermal shock resistance.

The honeycomb structure having a desirable porosity and a desirable average pore diameter can be obtained by adjusting particle diameters and a blending amount of the ceramic raw material for use, and particle diameters and a blending amount of the pore former to be added.

There is not any special restriction on a method of kneading the forming raw material to form the kneaded material, and an example of the method includes a method in which a kneader, a vacuum pugmill or the like is used.

Next, the obtained kneaded material is extruded to obtain the honeycomb formed body. At this time, a predetermined die is preferably used so that the honeycomb formed body having the partition walls and the dividing wall can be obtained. As a material of the die, a cemented carbide which is hard to be abraded is preferable.

There is not any special restriction on a thickness of the dividing wall as long as the circumferential wall having a desirable thickness can be obtained after the honeycomb formed body is fired. The thickness of the dividing wall can be, for example, from 1 to 3 mm.

[2-2] Plugging Arrangement Step:

Next, open ends of cells of a honeycomb structure body of the obtained honeycomb fired body are plugged by a plugging material. An example of a method of plugging the open ends of the cells includes a method of charging the open ends of the cells with the plugging material. The method of charging the open ends of the cells with the plugging material can be carried out according to a heretofore known manufacturing method of a plugged honeycomb structure. As the ceramic raw material to form the plugging material, a ceramic raw material for use in the heretofore known manufacturing method of the honeycomb structure can be used. As the ceramic raw material to form the plugging material, the same ceramic raw material as that used in the preparation of the honeycomb formed body is preferably used. It is to be noted that to adjust a porosity, pore diameters and the like of plugging portions formed by the plugging material, particle diameters and a blending amount of ceramic raw material powder and particle diameters and a blending amount of pore former powder to be added may suitably be changed.

The open ends of the cells are charged with the plugging material and then the plugging material is dried or fired, whereby the honeycomb structure of the present embodiment can be manufactured. A step of charging the open ends of the cells with the plugging material may be performed before the honeycomb formed body is fired. The manufacturing method of the honeycomb structure of the present embodiment is not limited to the hitherto described method.

[2-3] Firing Step:

Next, the honeycomb formed body is fired to obtain the honeycomb fired body (a firing step). A firing temperature can suitably be determined in accordance with the material of the honeycomb formed body. For example, when the material of the honeycomb formed body is cordierite, a firing temperature is preferably from 1380 to 1450° C. and further preferably from 1400 to 1440° C. Furthermore, a firing time is defined as a time to retain the maximum temperature, and is preferably from about 4 to 6 hours.

The honeycomb formed body may be dried before firing. There is not any special restriction on a drying method. Examples of the drying method include hot air drying, microwave drying, induction drying, reduced pressure drying, vacuum drying and freeze drying. Above all, it is preferable that the induction drying, the microwave drying or the hot air drying is performed alone or any combination of them is performed. Furthermore, as drying conditions, it is preferable that a drying temperature is from 30 to 150° C. and a drying time is from 1 minute to 2 hours.

[2-4] Honeycomb Structure Preparing Step:

Next, a part of an outer portion of the obtained honeycomb fired body is ground from one end face to expose a part of the dividing wall, thereby preparing the honeycomb structure including the partition walls and the dividing wall (the circumferential wall). The honeycomb fired body may be ground after the honeycomb formed body is dried and before the honeycomb formed body is fired.

[3] Manufacturing Method of Exhaust Gas Treating Device:

The exhaust gas treating device of the present embodiment can be prepared by storing the manufactured honeycomb structure in the above can member.

As shown in FIG. 2, the exhaust gas flows through the exhaust gas treating device prepared as described above. That is, in the exhaust gas treating device 100, the exhaust gas flows into the honeycomb structure 10 from the side of the inner inflow end face 11 of the inner honeycomb structure body 14 of the honeycomb structure 10, and flows out from the inner outflow end face 12 of the inner honeycomb structure body 14. Afterward, the exhaust gas flowing into the return space 41 flows into the outer honeycomb structure body 16 from the side of the outer inflow end face 18 of the outer honeycomb structure body 16, and flows out from the outer outflow end face 19. At this time, the exhaust gas flowing out from the outer outflow end face 19 of the outer honeycomb structure body 16 is introduced into the space (the temperature raising assistance space) 43 between the circumferential wall 5 of the inner honeycomb structure body 14 and the barrel portion 25 of the can member 20. Afterward, the above exhaust gas is emitted from the outlet 27 of the can member 20 while coming into contact with the circumferential wall 5.

EXAMPLES

Hereinafter, the present invention will specifically be described on the basis of examples, but the present invention is not limited to these examples.

Example 1

To 100 parts by mass of cordierite forming raw material, there were added 13 parts by mass of pore former, 35 parts by mass of dispersing medium, 6 parts by mass of organic binder, and 0.5 parts by mass of dispersing agent, which was followed by mixing and kneading to prepare a kneaded material. As the cordierite forming raw material, alumina, aluminum hydroxide, kaolin, talc and silica were used. Water was used as the dispersing medium, coke having an average particle diameter of 1 to 10 μm was used as the pore former, hydroxypropylmethylcellulose was used as the organic binder and ethylene glycol was used as the dispersing agent. Particle diameters and an amount of the pore former were controlled to control pore diameters and a porosity of partition walls.

Next, the kneaded material was extruded by using a predetermined die to obtain a honeycomb formed body having partition walls and a dividing wall, so that the round pillar-shaped honeycomb formed body was obtained.

Next, the honeycomb formed body was dried with a microwave dryer and further dried completely with a hot air dryer, followed by cutting both end faces of the honeycomb formed body to adjust the honeycomb formed body into a predetermined dimension.

Next, one open end of each cell of the honeycomb formed body was charged with a plugging slurry to form each plugging portion.

An arrangement pattern of the plugging portions shown in FIG. 4A was employed. Specifically, in the plugged honeycomb formed body, the plugging portions were arranged in end portions of predetermined cells on the side of an outer inflow end face and end portions of the residual cells on the side of an outer outflow end face among the cells of an outer honeycomb structure body, and the plugging portions were not arranged in an inner honeycomb structure body.

In a forming method of the plugging portions, a sheet was first attached to each of one end face and the other end face of a portion corresponding to the outer honeycomb structure body of the honeycomb formed body, and holes were made at positions of this sheet which corresponded to the cells in which the plugging portions were to be formed. Next, in a state where this sheet remained to be attached, the plugging slurry was applied to the above end face of the honeycomb formed body to push the slurry into the honeycomb formed body, and the predetermined cells of the honeycomb formed body were charged with the plugging slurry. As the plugging slurry, a slurry in which a material constituting the plugging portions is slurried was used.

Afterward, the plugged honeycomb formed body was dried with the hot air dryer, and further fired at 1410 to 1440° C. for 5 hours to obtain a honeycomb fired body.

Next, a part of an outer portion of the honeycomb fired body was ground from the one end face to expose a part of the dividing wall, thereby obtaining a honeycomb structure. A length of the honeycomb structure in an extending direction of the cells was 140 mm (Table 1 shows the length as "a system total length"). A length of the outer honeycomb structure body in the cell extending direction was 100 mm. A length of a convex portion of the inner honeycomb structure body in the cell extending direction was 40 mm. Furthermore, in the honeycomb structure, the inner honeycomb structure body and the outer honeycomb structure body had a round pillar shape, a diameter of the inner honeycomb structure body was 80 mm, and a diameter of a total (a second end face) of the inner honeycomb structure body and the outer honeycomb structure body was 144 mm.

Furthermore, in the honeycomb structure, a cell density of the inner honeycomb structure body was 46.5 cells/cm$^2$. Specifically, a cell density of the convex portion of the inner honeycomb structure body was equal to a cell density of a portion other than the convex portion (the portion covered with the outer honeycomb structure body). A cell density of the outer honeycomb structure body was 46.5 cells/cm$^2$. A thickness of outer partition walls (the partition walls of the outer honeycomb structure body) was 0.21 mm and a thickness of inner partition walls (the inner honeycomb structure body) was 0.21 mm. A circumferential wall of the inner honeycomb structure body was formed integrally with the inner partition walls of the inner honeycomb structure body. It is to be noted that Table 1 shows the thickness of the inner partition walls in "a partition wall thickness" of a column of "the convex portion/a first honeycomb structure" and "a partition wall thickness" of a column of "the inner honeycomb structure body (excluding the convex portion)/a second honeycomb structure".

Next, the obtained honeycomb structure was stored in a can member. A cushioning member constituted of a ceramic mat was disposed in a space between the honeycomb structure and the can member. As the can member, there was used a can member having an inflow tube which fitted with an end portion of the inner honeycomb structure body on the side of an inner inflow end face and in which an inlet of an exhaust gas was formed, and a barrel portion which was continuous with the inflow tube. Further, in the barrel portion of the can member, an outlet of the exhaust gas was formed at a position between the inner inflow end face of the inner honeycomb structure body and the outer outflow end face of the outer honeycomb structure body. Furthermore, the honeycomb structure was stored in the can member in a state of having a space (a return space) which served as a through channel for the exhaust gas between the second end face and the can member and having a space (a temperature raising assistance space) which served as a through channel for the exhaust gas between the outer outflow end face of the outer honeycomb structure body and the can member. Furthermore, in the can member, an outlet for EGR was formed. Additionally, the can member made of stainless steel was used. In this way, an exhaust gas treating device was obtained.

Next, as to the obtained exhaust gas treating device, evaluations of "the system total length", "a purifying ratio" and "PM trapping" were performed by methods mentioned below. Table 1 shows the results.

[System Total Length]

A distance from an inflow end face for the exhaust gas to the farthest position of the honeycomb structure in the cell extending direction was defined as the system total length. At this time, when the system total length was 200 mm or less, the exhaust gas treating device was noticeably evaluated as "pass". When the system total length was in excess of 200 mm, the exhaust gas treating device was noticeably evaluated as "failure".

[Purifying Ratio]

When emissions of all components (carbon monoxide, hydrocarbons and nitrogen oxides) were compared with European regulation values of EURO6 and the emissions were lower than the regulation values, the evaluation was the pass "B", and when the emissions were not lower than the regulation values, the evaluation was the failure "C". Furthermore, in the evaluation B, a case where carbon monoxide decreased by 30% of the regulation value was evaluated as "A", and a case where carbon monoxide decreased by 50% was evaluated as "AA".

[PM Trapping]

When the number of PM particles generated from a vehicle was defined as $1.0 \times 10^{12}$ particles/km, European regulation value of $6.0 \times 10^{11}$ particles/km of EURO6 was used as a standard, and a case where the number of the PM particles in an exhaust gas trapped in the exhaust gas treating device was smaller than 40% of the above standard was evaluated as "D". Further, a case where the number of the PM particles in the exhaust gas trapped in the exhaust gas treating device was 40% or more and smaller than 60% of the above standard was evaluated as "C". Further, a case where the number of the PM particles in the exhaust gas trapped in the exhaust gas treating device was 60% or more and smaller than 80% of the above standard was evaluated as "B". Further, a case where the number of the PM particles in the exhaust gas trapped in the exhaust gas treating device was 80% or more of the above standard was evaluated as "A".

TABLE 1

| | Convex portion/first honeycomb structure | | | Inner honeycomb structure body (excluding the convex portion)/ second honeycomb structure | | | | Outer honeycomb structure body/ third honeycomb structure | | | | | | |
|---|---|---|---|---|---|---|---|---|---|---|---|---|---|---|
| | Partition wall thickness (mm) | Cell density (cells/cm$^2$) | Plugging portion | Length (mm) | Partition wall thickness (mm) | Cell density (cells/cm$^2$) | Plugging portion | Length (mm) | Partition wall thickness (mm) | Cell density (cells/cm$^2$) | Plugging portion | Length (mm) | System total length (mm) | Purifying ratio | PM trapping |
| Comparative Example 1 | 0.21 | 46.5 | None | 40 | 0.21 | 46.5 | None | 100 | 0.21 | 46.5 | Present in both faces | 218 | 358 | A | A |

TABLE 1-continued

| | Convex portion/first honeycomb structure | | | | Inner honeycomb structure body (excluding the convex portion)/ second honeycomb structure | | | | Outer honeycomb structure body/ third honeycomb structure | | | | | | |
|---|---|---|---|---|---|---|---|---|---|---|---|---|---|---|---|
| | Partition wall thickness (mm) | Cell density (cells/ cm²) | Plugging portion | Length (mm) | Partition wall thickness (mm) | Cell density (cells/ cm²) | Plugging portion | Length (mm) | Partition wall thickness (mm) | Cell density (cells/ cm²) | Plugging portion | Length (mm) | System total length (mm) | Purifying ratio | PM trapping |
| Example 1 | 0.21 | 46.5 | None | 40 | 0.21 | 46.5 | None | 100 | 0.21 | 46.5 | Present in both faces | 100 | 140 | B | A |
| Comparative Example 2 | 0.21 | 46.5 | None | 40 | — | — | — | 0 | 0.21 | 46.5 | Present in both faces | 100 | 140 | C | A |
| Comparative Example 3 | 0.21 | 46.5 | None | 40 | 0.21 | 46.5 | None | 100 | — | — | — | — | 100 | 140 | B | D |
| Comparative Example 4 | 0.21 | 46.5 | None | 40 | 0.21 | 46.5 | None | 50 | — | — | — | — | 50 | 140 | C | D |
| Comparative Example 5 | 0.21 | 46.5 | None | 40 | 0.21 | 46.5 | None | 100 | 0.21 | 46.5 | Present in both faces | 218 | 250 | B | A |
| Example 2 | 0.21 | 46.5 | None | 40 | 0.21 | 46.5 | Present (inner outflow end face side) | 100 | 0.21 | 46.5 | Present in both faces | 100 | 140 | B | A |
| Example 3 | 0.21 | 46.5 | None | 40 | 0.21 | 46.5 | Present (inner outflow end face side) | 100 | 0.21 | 46.5 | Present (outer inflow end face side) | 100 | 140 | B | B |
| Example 4 | 0.21 | 46.5 | None | 40 | 0.21 | 46.5 | Present (inner outflow end face side) | 100 | 0.21 | 46.5 | Present (outer outflow end face side) | 100 | 140 | B | B |
| Example 5 | 0.21 | 46.5 | None | 40 | 0.21 | 46.5 | Present (inner inflow end face side) | 100 | 0.21 | 46.5 | Present (outer inflow end face side) | 100 | 140 | B | B |
| Example 6 | 0.21 | 46.5 | None | 40 | 0.21 | 46.5 | Present (inner inflow end face side) | 100 | 0.21 | 46.5 | Present (outer outflow end face side) | 100 | 140 | B | B |
| Example 7 | 0.21 | 46.5 | None | 40 | 0.21 | 46.5 | None | 100 | 0.21 | 46.5 | Present (outer inflow end face side) | 100 | 140 | A | C |
| Example 8 | 0.21 | 46.5 | None | 40 | 0.21 | 46.5 | None | 100 | 0.21 | 46.5 | Present (outer outflow end face side) | 100 | 140 | A | C |
| Example 9 | 0.09 | 93 | None | 40 | 0.09 | 93 | None | 100 | 0.21 | 46.5 | Present in both faces | 100 | 140 | AA | A |

In Table 1, the column of "the convex portion/the first honeycomb structure" shows "a partition wall thickness", "a cell density", the presence/absence of "plugging portions" and a length of the convex portion of the inner honeycomb structure body in each example. Furthermore, in each comparative example, the columns show "a partition wall thickness", "a cell density", the presence/absence of "plugging portions" and a length of a first honeycomb structure in each of exhaust gas treating devices 200 and 201 shown in FIG. 5 and FIG. 6.

Figure 5:
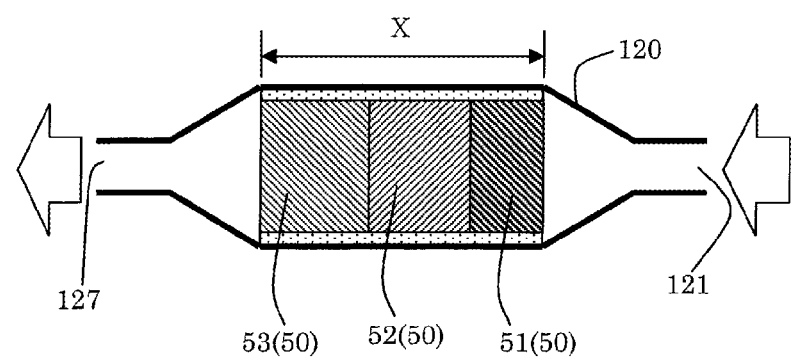
FIG. 5 is an explanatory view schematically showing an exhaust gas treating device of each of Comparative Examples 1 to 4.
Figure 6:
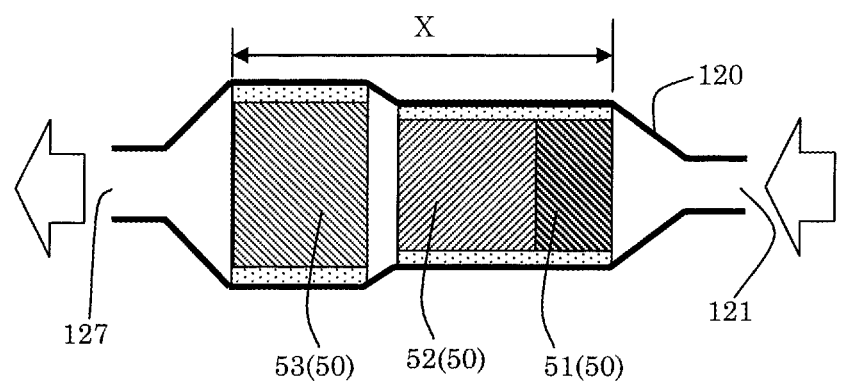
FIG. 6 is an explanatory view schematically showing an exhaust gas treating device of Comparative Example 5.

It is to be noted that each of the exhaust gas treating devices 200 and 201 shown in FIG. 5 and FIG. 6 includes a can member 120 in which an inlet 121 and an outlet 127 for an exhaust gas are formed, and a filter group 50 constituted of three honeycomb structures stored in the can member 120. The filter group 50 includes a first honeycomb structure 51, a second honeycomb structure 52 and a third honeycomb structure 53 arranged in this order from the side of the inlet 121 of the exhaust gas in the can member 120. Further, each of the honeycomb structures 51, 52 and 53 had a round pillar shape, and a diameter of the first honeycomb structure 51 was 80 mm. Furthermore, in Comparative Example 5, a diameter of the third honeycomb structure 53 was 120 mm. In Comparative Examples 1 to 4, the exhaust gas treating device 200 shown in FIG. 5 was used, and in Comparative Example 5, the exhaust gas treating device 201 shown in FIG. 6 was used. It is to be noted that in FIG. 5 and FIG. 6, symbol X shows a length (the system total length) of the exhaust gas treating device.

Furthermore, in Table 1, the column of "the inner honeycomb structure body (excluding the convex portion)/the second honeycomb structure" shows "a partition wall thickness", "a cell density", the presence/absence of "plugging portions" and a length of the inner honeycomb structure body (excluding the convex portion) in each example. Furthermore, in each comparative example, the column shows "a partition wall thickness", "a cell density", the presence/absence of "plugging portions" and a length of the second honeycomb structure in each of the exhaust gas treating devices 200 and 201 shown in FIG. 5 and FIG. 6.

Furthermore, in Table 1, the column of "the outer honeycomb structure body/the third honeycomb structure" shows "a partition wall thickness", "a cell density", the presence/absence of "plugging portions" and a length of the outer honeycomb structure body in each example. Furthermore, in each comparative example, the columns show "a partition wall thickness", "a cell density", the presence/absence of "plugging portions" and a length of the third honeycomb structure in each of the exhaust gas treating devices 200 and 201 shown in FIG. 5 and FIG. 6.

Examples 2 to 9 and Comparative Examples 1 to 5

The procedure of Example 1 was repeated except that changes were made as shown in Table 1, to evaluate "a system total length", "a purifying ratio" and "PM trapping". Table 1 shows the results.

Table 1 shows that each of exhaust gas treating devices of Examples 1 to 9 can be downsized as a whole and the exhaust gas treating device is easily heated and hard to be rapidly cooled as compared with exhaust gas treating devices of Comparative Examples 1 to 5.

An exhaust gas treating device of the present invention can be employed as a filter which purifies an exhaust gas emitted from a car or the like. Furthermore, in a manufacturing method of a honeycomb structure of the present invention, the honeycomb structure of the exhaust gas treating device of the present invention can suitably be prepared.

DESCRIPTION OF REFERENCE NUMERALS

1: inner partition wall, 2: cell, 3: outer partition wall, 5: circumferential wall, 8: plugging portion, 10: honeycomb structure, 10a: first end face, 10b: second end face, 11: inner inflow end face, 12: inner outflow end face, 14: inner honeycomb structure body, 14a: convex portion, 16: outer honeycomb structure body, 18: outer inflow end face, 19: outer outflow end face, 20 and 120: can member, 21: inlet, 23: inflow tube, 25: barrel portion, 27: outlet, 28: outlet for EGR, 30: honeycomb substrate, 41: return space, 43: temperature raising assistance space, 50: filter group, 51: first honeycomb structure, 52: second honeycomb structure, 53: third honeycomb structure, 100, 200 and 201: exhaust gas treating device, and X: system total length.

What is claimed is:

1. An exhaust gas treating device comprising:
   a honeycomb structure having porous partition walls defining a plurality of cells extending from a first end face which is one end face to a second end face which is the other end face; and
   a can member which stores the honeycomb structure,
   wherein the honeycomb structure comprises an inner honeycomb structure body including a honeycomb substrate having porous inner partition walls defining the plurality of cells extending from an inner inflow end face which is the end face on the side of the first end face to an inner outflow end face which is the end face on the side of the second end face and a circumferential wall disposed at a circumference of the honeycomb substrate, an outer honeycomb structure body disposed at a position which surrounds a part of a circumference of the inner honeycomb structure body and is away from the inner inflow end face of the inner honeycomb structure body, the outer honeycomb structure body has porous outer partition walls defining the plurality of cells extending from an outer inflow end face which is the end face on the side of the second end face to an outer outflow end face which is the end face on the side of the first end face, wherein the inner outflow end face of the inner honeycomb structure body is aligned with the outer inflow end face of the outer honeycomb structure body, and plugging portions arranged in parts of the cells,
   the can member comprises an inflow tube which fits with an end portion of the inner honeycomb structure body on the side of the inner inflow end face and in which an inlet of an exhaust gas is formed, and a barrel portion which is continuous with the inflow tube,
   in the barrel portion, an outlet of the exhaust gas is formed at a position between the inner inflow end face of the inner honeycomb structure body and the outer outflow end face of the outer honeycomb structure body, and
   the honeycomb structure is stored in the can member in a state of having a clearance which serves as a through channel for the exhaust gas between the second end face and the can member and having a clearance which serves as a through channel for the exhaust gas between the outer outflow end face of the outer honeycomb structure body and the can member.

2. The exhaust gas treating device according to claim 1, wherein the plugging portions are not arranged in the inner honeycomb structure body or are arranged only in one end portion of the inner honeycomb structure body, and the plugging portions are arranged only in one of end portions of the outer honeycomb structure body or are arranged in both of the end portions.

3. The exhaust gas treating device according to claim 2, wherein the plugging portions are arranged in end portions of the predetermined cells on the side of the outer inflow end face and end portions of the residual cells on the side of the outer outflow end face among the cells of the outer honeycomb structure body, and the plugging portions are not arranged in the inner honeycomb structure body.

4. The exhaust gas treating device according to claim 2, wherein the plugging portions are arranged in parts of end portions of the inner honeycomb structure body on the side of any one of the inner inflow end face and the inner outflow end face.

5. The exhaust gas treating device according to claim 1, wherein a thickness of the outer partition walls of the outer honeycomb structure body is larger than a thickness of the inner partition walls of the inner honeycomb structure body.

6. The exhaust gas treating device according to claim 1, wherein a cell density of the outer honeycomb structure body is smaller than a cell density of the inner honeycomb structure body.

7. The exhaust gas treating device according to claim 1, wherein the circumferential wall of the inner honeycomb structure body is formed integrally with the inner partition walls of the inner honeycomb structure body.

8. The exhaust gas treating device according to claim 1, wherein in the can member, an outlet for EGR which connects with a route to recirculate the exhaust gas is formed at a position between the inner inflow end face of the inner honeycomb structure body and the outer outflow end face of the outer honeycomb structure body.

9. The exhaust gas treating device according to claim 1, wherein a sound absorbing material is disposed in a clearance between the second end face of the honeycomb structure and the can member.

10. A manufacturing method of a honeycomb structure comprising:
- a honeycomb formed body preparing step of preparing a honeycomb formed body comprising partition walls defining a plurality of cells extending from an inflow end face which is one end face to an outflow end face which is the other end face, and a dividing wall which divides a cross section perpendicular to an extending direction of the cells into an outer portion and an inner portion;
- a plugging arrangement step of charging end portions of parts of the cells of the prepared honeycomb formed body with a plugging slurry to arrange plugging portions, thereby obtaining a plugged honeycomb formed body;
- a firing step of firing the prepared plugged honeycomb formed body to obtain a honeycomb fired body; and
- a honeycomb structure preparing step of grinding a part of the outer portion of the honeycomb fired body from the one end face to expose a part of the dividing wall, thereby obtaining the honeycomb structure, wherein the honeycomb structure comprises an inner honeycomb structure body including a honeycomb substrate having porous inner partition walls defining the plurality of cells extending from an inner inflow end face which is the end face on the side of the first end face to an inner outflow end face which is the end face on the side of the second end face and a circumferential wall disposed at a circumference of the honeycomb substrate, and an outer honeycomb structure body disposed at a position which surrounds a part of a circumference of the inner honeycomb structure body and is away from the inner inflow end face of the inner honeycomb structure body, the outer honeycomb structure body has porous outer partition walls defining the plurality of cells extending from an outer inflow end face which is the end face on the side of the second end face to an outer outflow end face which is the end face on the side of the first end face, and wherein the inner outflow end face of the inner honeycomb structure body is aligned with the outer inflow end face of the outer honeycomb structure body, and plugging portions arranged in parts of the cells.

* * * * *